May 13, 1952
G. E. DANIELS
2,596,375
METHOD OF STAMPING AND ASSEMBLING
MULTIPART CONDUCTOR CLAMPS
Filed Jan. 9, 1948
5 Sheets-Sheet 1
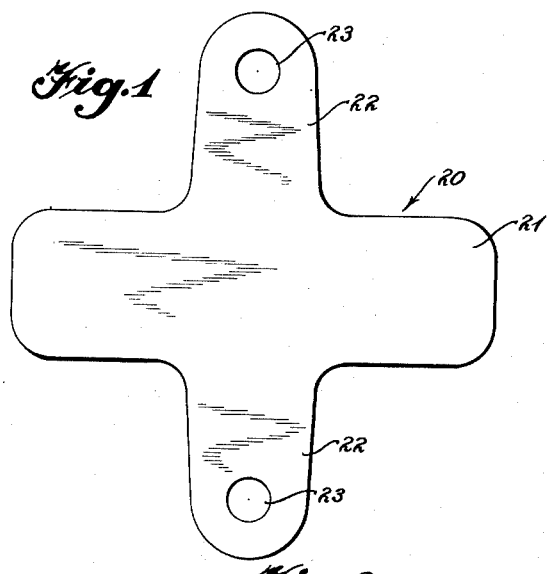
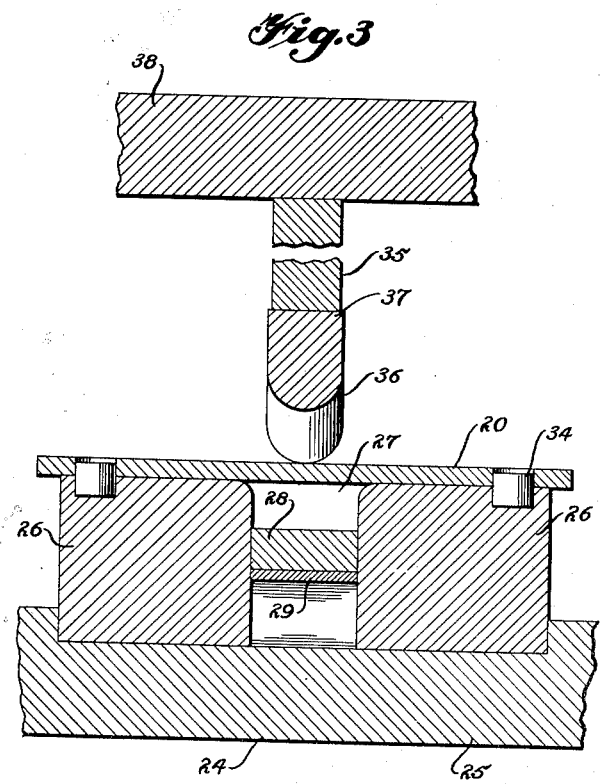
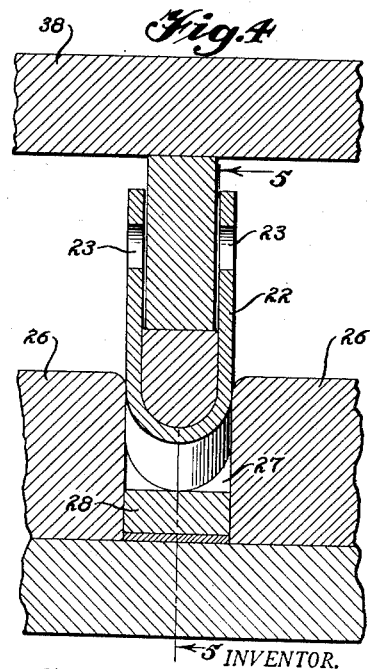
INVENTOR.
Gordon E. Daniels
BY
Cushman Darby Cushman
Attorneys

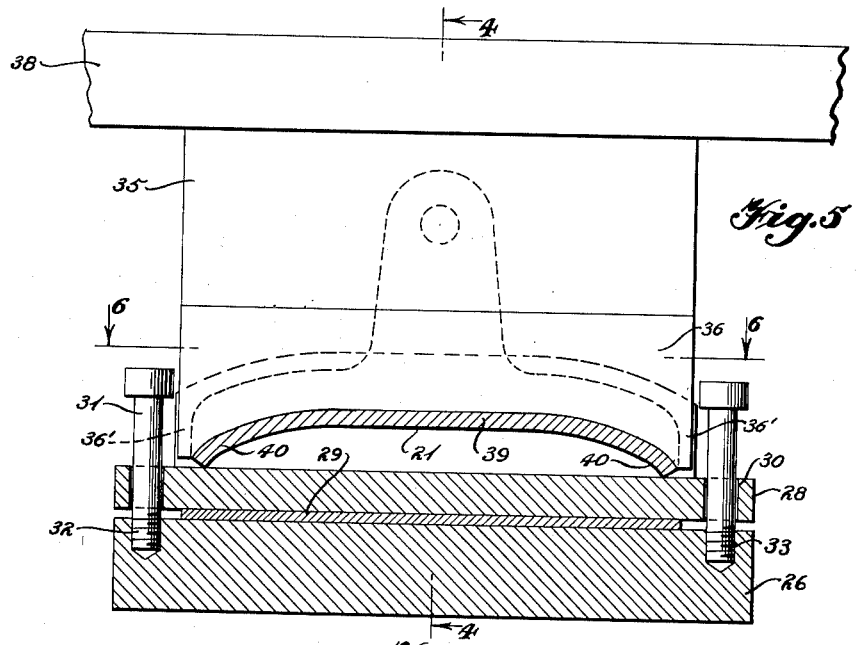
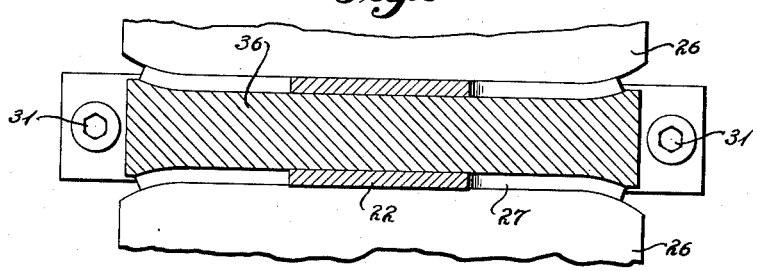
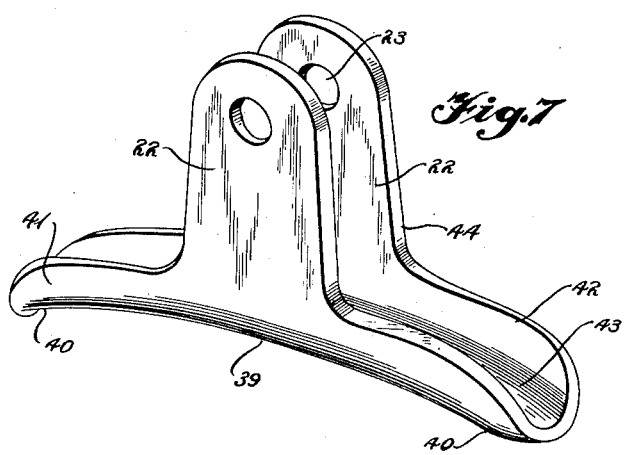

May 13, 1952
G. E. DANIELS
2,596,375
METHOD OF STAMPING AND ASSEMBLING
MULTIPART CONDUCTOR CLAMPS
Filed Jan. 9, 1948
5 Sheets-Sheet 3
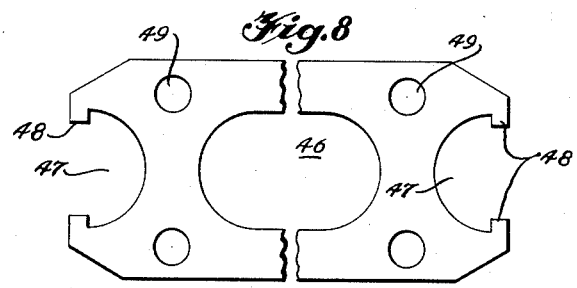
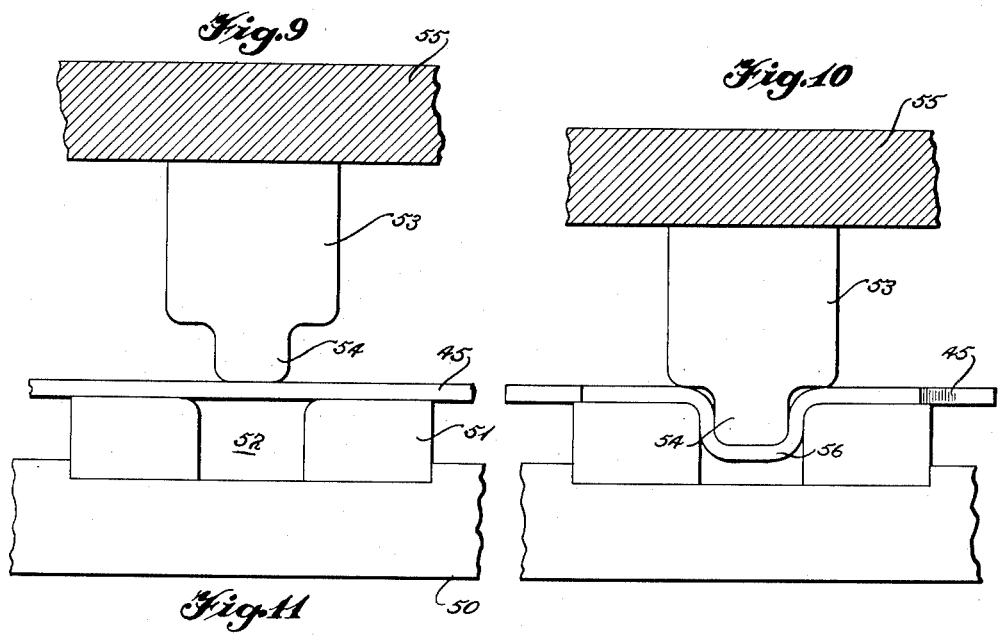
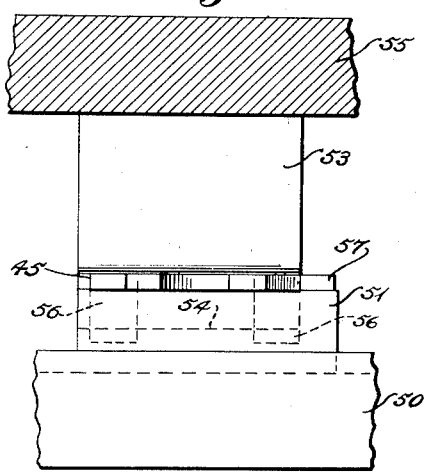
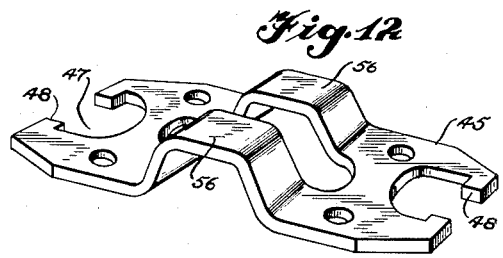
INVENTOR.
Gordon E. Daniels
BY
Cushman Darby Cushman
attorneys May 13, 1952            G. E. DANIELS           2,596,375
METHOD OF STAMPING AND ASSEMBLING
MULTIPART CONDUCTOR CLAMPS
Filed Jan. 9, 1948                                          5 Sheets—Sheet 4
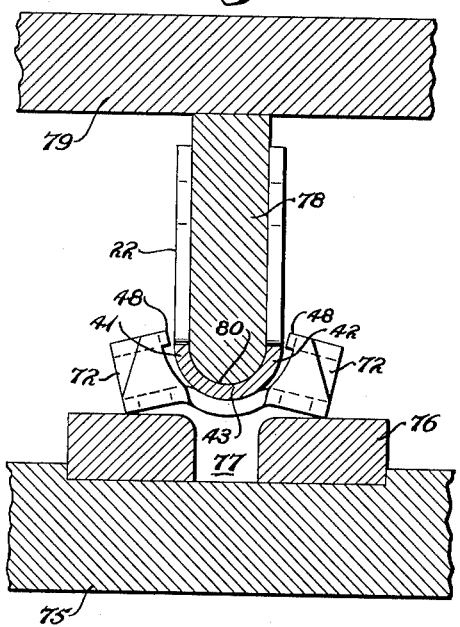
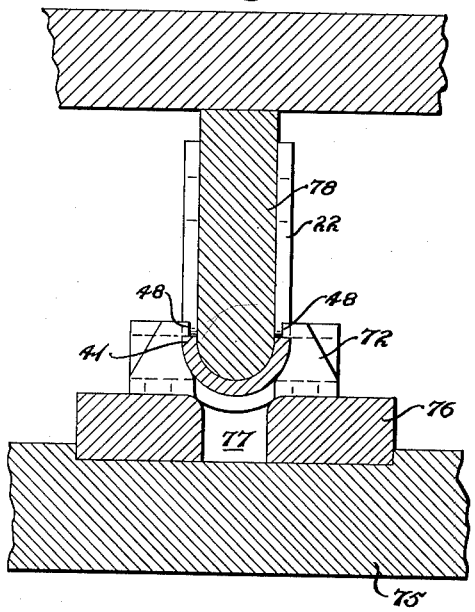
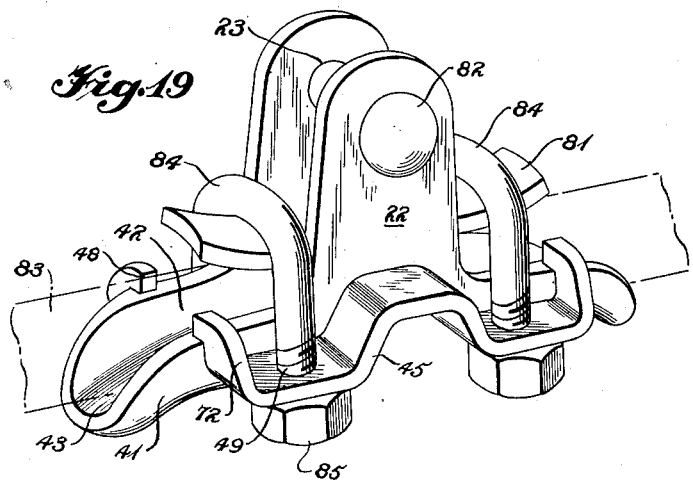
INVENTOR.
*Gordon E. Daniels*
BY
Attorneys May 13, 1952            G. E. DANIELS            2,596,375
METHOD OF STAMPING AND ASSEMBLING
MULTIPART CONDUCTOR CLAMPS
Filed Jan. 9, 1948            5 Sheets-Sheet 5
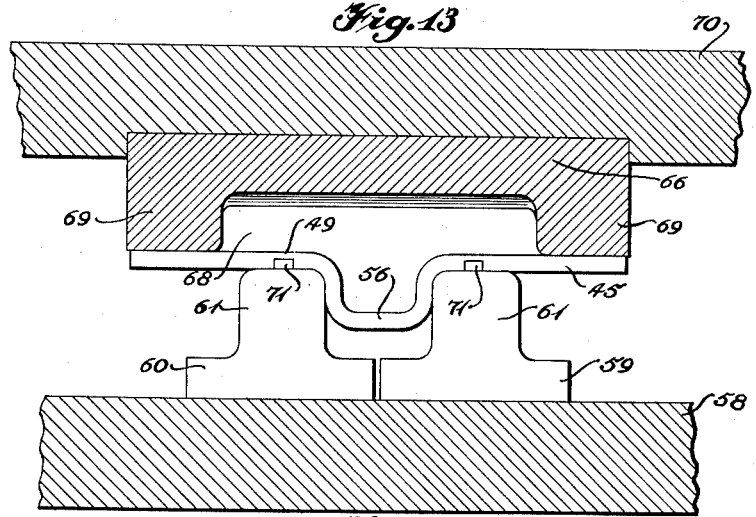
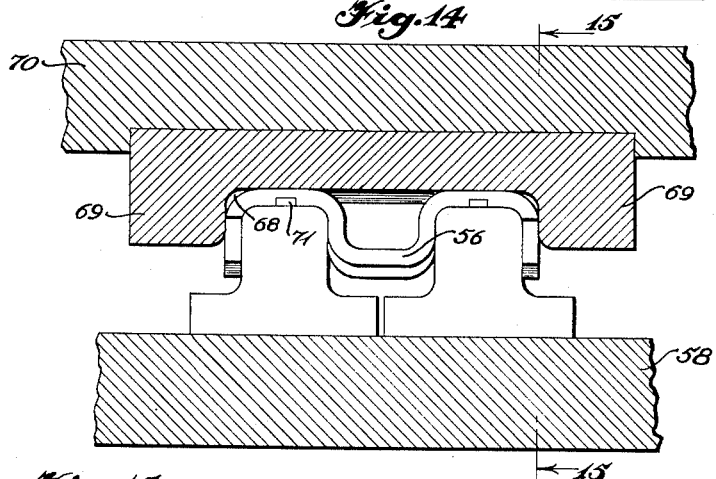
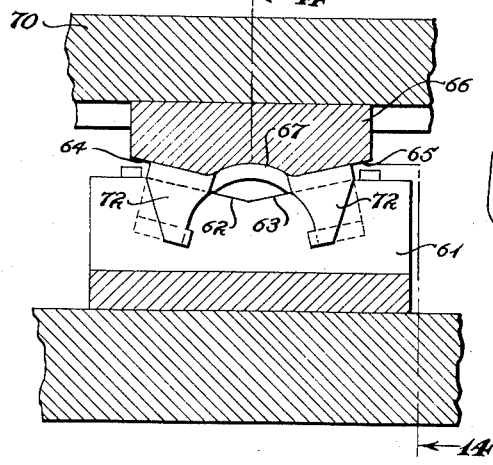
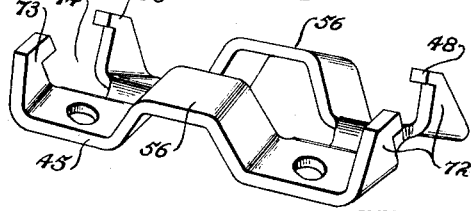
INVENTOR.
Gordon E. Daniels
BY
*Cushman Darby Cushman*
Attorneys Patented May 13, 1952

2,596,375

UNITED STATES PATENT OFFICE 2,596,375

METHOD OF STAMPING AND ASSEMBLING MULTIPART CONDUCTOR CLAMPS

Gordon E. Daniels, Nashville, Tenn., assignor to Kerrigan Iron Works, Inc., Nashville, Tenn., a corporation of Tennessee Application January 9, 1948, Serial No. 1,332

3 Claims. (Cl. 29—148)

The present invention relates to suspension clamps and to a new and improved method of forming and assembling a multi-part clamp.

Heretofore it has been customary in making suspension clamps to provide the clamp body with interrupted pocketed bosses for receiving the U-shaped retaining bolts. These pockets have been found objectional since they collect and retain liquid, dust, and other foreign matter that is injurious to the conductor and necessitates frequent inspection and repair.

Accordingly, an important object of the present invention is to provide a simple, efficient and economical method for stamping the clamp body from a blank of sheet metal and separately stamping a bracket member, and then locking the bracket member to the body so as to form a unitary clamp structure for receiving a high voltage transmission line conductor, cable, wire, or the like, so that the assembled clamp may be conveniently connected to a suitable support.

Other objects and advantages of the invention will become apparent from the following description when taken in conjunction with the accompanying claims and drawings.

Referring to the drawings in which is shown a preferred embodiment of the means employed for stamping and assembling a multi-part clamp in accordance with the present method;

Figure 1 is a plan view of a sheet metal blank from which the body of the clamp is formed.

Figure 2 is a side view of Figure 1.

Figure 3 is a sectional end view of parts of upper and lower dies of a drawing press showing the blank in position and prior to the initiation of the stamping operation.

Figure 4 is a sectional view taken substantially along the line 4—4 of Figure 5, and showing the parts in stamping position.

Figure 5 is a sectional view taken substantially along the line 5—5 of Figure 4.

Figure 6 is a sectional plan view taken substantially along the line 6—6 of Figure 5.

Figure 7 is a perspective view of the clamp body in its completed form.

Figure 8 is a plan view of a sheet metal bracket blank which has been previously shaped or cut out to form the configuration as shown.

Figure 9 is an end view of the dies for initially stamping the blank shown in Figure 8 and with the upper die in its raised position.

Figure 10 is a view similar to Figure 9 showing the upper die moved to its lower or stamping position.

Figure 11 is a side view of Figure 10.

Figure 12 is a perspective view of the formed bracket member provided with the spaced intermediate lateral offset portions.

Figure 13 is an end view with parts in section of die members for receiving the bracket member shown in Figure 12 for completing the shape thereof.

Figure 14 is a sectional view taken substantially along the line 14—14 of Figure 15.

Figure 15 is a sectional view taken substantially along the line 15—15 of Figure 14.

Figure 16 is a perspective view of the bracket member in the form which it assumes when it issues from the dies shown in Figures 13, 14 and 15.

Figure 17 is an end view of die members for connecting the bracket member shown in Figure 16 to the clamp body shown in Figure 7 with the parts of the press in their raised position.

Figure 18 is a view similar to Figure 17 with the parts in their lower or locking position, and Figure 19 is a perspective view of a completed clamp structure formed and assembled in accordance with the present method.

In forming the multi-part clamp in accordance with the present method, the blank 20 which may be formed of suitable light, durable, corrosion resisting metal such as aluminum or steel, is initially formed of cruciformed shape as shown in Figure 1, to provide an elongated flat body 21 that has extending from opposite sides and intermediate its ends the lateral flat arms 22 which are punched to form holes 23. The cruciformed blank 20 is then positioned on the lower die member 24 which has a stationary base 25 on which is mounted a die block 26 that is provided with a central elongated opening or recess 27 (Fig. 3), in which is movably mounted an ejector 28 and a flat spring 29. The ends of the ejector 28 are provided with openings 30 (Fig. 5), through which extend the guide bolts 31 that are threaded at their lower ends as at 32 to fit into complementary formed threaded sockets or recesses 33 in the upper surface of the block 26. The block 26 is also formed with upwardly projecting lugs or pins 34 (Fig. 3), arranged to receive the holes 23 in the blank 20 when the latter is initially positioned on the block 26. A drawing punch or upper die member 35 has suitably attached thereto a concave or segmental nose 36 as at 37. The nose 36 is provided with depending ends 36' and is connected at its upper end to a die shoe or member 38 which is in turn operatively associated with the press to move the nose 36 into and out of the opening 27 in the block 26. The preformed blank 20 is initially positioned on top of the block 26 with the body 21 extending over the elongated opening 27 and the pins 34 engaging the holes 23 in the arms 22 to retain the blank in a fixed position on the press. The curved nose 36 is then moved downwardly under pressure into engagement with the blank 20 and into the elongated opening 27 so as to form the body 21 (Fig. 5) with an intermediate straight portion 39 and with downwardly extending ends so as to form the flared lips 40. The opposite sides of the body 21 are also swaged to form the upstanding sides 41 and 42 and the longitudinal trough or groove 43 that extends throughout the length of the clamp body so as to constitute a seat for an electrical conductor, ground wire, cable or the like that is to be suspended or supported by the clamp. At the same time the arms 22 are bent upwardly (Fig. 4), so as to form parallel suspension elements and position the holes 23 in transverse alignment with each other. After the stamping operation is completed, the punch 35 and nose 36 are moved away from the block 26 and the spring 29 forces the ejector 28 upwardly so as to withdraw the formed clamp body 44 (Fig. 7), from the press.

The bracket member which is associated with the body 44 to constitute the clamp is formed from a sheet metal blank 45 (Fig. 8), preferably of the same metal and thickness as the blank 20, and initially is cut out to form a central elongated opening 46 and curved recessed end portions 47 shaped to provide inwardly extending opposed lugs or clamping jaws 48. The blank is also provided with spaced bolt-receiving holes 49. A drawing press 50 has a die block 51 provided with an elongated centrally disposed opening 52 which is arranged to co-act with a movable punch or die member 53 having a reduced elongated nose 54 extending substantially the length of the opening 52 and arranged to be moved into the latter during the stamping operation. The punch 53 is connected to an arm or member 55 which is operatively connected to the press so as to move the nose 54 into and out of the opening 52 during the operation of the press. The preformed bracket member 45 is placed on the block 51 with the elongated opening 46 aligning with the opening 52 and the punch 53 is then moved downwardly so that the nose 54 forces the intermediate portion of the blank 45 into the opening 52 to form the spaced intermediate lateral offset raised portions or protuberances 56. A stop 57 may be positioned at one end of the block 51 so as to maintain and guide the blank 45 into proper position to form the lateral offset portions 56. The blank 45 with the lateral portions 56 formed thereon, is then transferred to another press 58 on which is mounted a pair of spaced blocks 59 and 60 having upwardly extending die members 61, each of which has its upper surface provided with downwardly converging inclined portions 62 and 63 which co-act with complementary formed surfaces 64 and 65 on a punch 66 (Fig. 15). The inclined sides 64 and 65 of the punch 66 may be connected by an arcuate portion 67. The punch 66 is also formed with an elongated recess 68 (Fig. 13) and depending end portions 69. The punch 66 is connected to a member 70 which is operatively connected to the press so as to move the punch 66 and its associated parts downwardly into stamping engagement with the spaced die members 61 during the operation of the press. When the bracket blank 45 (Fig. 12) is inserted and positioned on the press 58, the spaced offset portions 56 extend into the opening between the block 61 (Fig. 13) and are retained in a fixed position by the pins 71 on the die members 61 which fit into the holes 49. Upon the punch 66 being moved downwardly from the position shown in Figure 13 to that disclosed in Figure 14, the lateral portions 56 are spread outwardly and away from each other and at the same time the ends of the blank 45 are bent laterally to form the spaced end flanges or jaws 72 and 73 (Fig. 16) by reason of the opposed inclined surfaces of the block 61 and the punch 66. It will be noted that now the recesses 47 form the end openings 74 and that these openings and the space between the protuberances 56 are such as to receive the clamp body 44 (Fig. 7). The clamp body 44 is then inserted in the formed bracket member 45 so that the upturned sides 41 and 42 of the clamp are positioned so as to be engaged by the lugs 48 on the end flanges 72 and the arms or suspension elements 22 are located adjacent and between the lateral portions 56. The parts thus assembled are then transferred to a press 75 having a block 76 formed with a central elongated opening 77 and with which co-acts a plunger 78 carried by an operating member 79. The lower end of the plunger or die 78 has a curved nose 80 which is arranged to fit into the longitudinal groove 43 of the clamp 44. These parts when initially assembled and mounted on the press assume the position shown in Figure 17. Upon movement of the plunger 78 downwardly towards the opening 77, the end flanges 72 are moved inwardly towards each other into engagement with the outer sides of the arms 22 and simultaneously the end flanges 72 are moved inwardly so that the lugs 48 are forced into locking engagement with the upper edge of the sides 41 and 42 of the clamp body so that the assembled parts assume the position as shown in Figure 18.

The keeper 81 may be then stamped so as to assume the configuration as shown in Figure 19 and the pivot pin 82 connected to the arms 22 through the openings 23. A high voltage transmission conductor, cable, wire or the like 83 may then be inserted in the groove or seat 43 and be firmly suspended by the clamp upon application of the keeper 81 and the connecting of the U-shaped bolts 84 to the bracket member 45 through the spaced openings 49 and the retaining bolts 85.

It will be observed that the trough 43 is coextensive in length with the clamp body and constitutes a continuous, unbroken seat for receiving the cable 83 and will not allow foreign matter such as dust and the like to collect therein. Moreover, the parts of the clamp are so constructed as to be light, yet strong and durable in order to be capable of withstanding the exacting uses to which devices of this character are subjected, and the clamp may be made and installed at a low cost and at a minimum expenditure of time and effort.

It will be understood that the clamp and the method for forming and assembling the same are merely illustrative of a preferred means of stamping and securing the parts together, and that such changes may be made without departing from the spirit of the invention as fall within the scope of the following claims.

I claim:
1. The method of stamping and assembling a multipart conductor clamp which includes forming a sheet metal blank having a longitudinally disposed elongated body and arms extending laterally from opposite sides thereof, inserting the blank between dies shaped to form the body with a longitudinal groove having upturned sides to provide a continuous, unbroken seat for a conductor, simultaneously bending the arms upwardly and substantially parallel to each other to form suspension elements, inserting an elongated sheet metal bracket blank member having a central opening and its ends recessed to provide inwardly extending opposed lugs, between dies shaped to form the intermediate portion of the elongated blank on opposite sides of the central opening into a pair of spaced raised laterally offset spreadable portions, removing the bracket blank member from the dies and inserting it between dies shaped to spread the spaced lateral offset portions away from each other and simultaneously to bend the ends of the bracket blank into laterally disposed end flanges having the opposed lugs spaced away from each other, positioning the formed body in the space between the lateral offset portions and the end flanges, and inserting the assembled parts between dies shaped to move the lateral offset portions into engagement with the outer sides of the body and for moving the end flanges inwardly so that the lugs thereon are brought into locking engagement with the upper edges of the sides of the body to form a unitary assembly.

2. The method of stamping and assembling a multipart conductor clamp which includes forming a sheet metal blank having a longitudinally disposed elongated body and arms extending laterally and centrally from opposite sides thereof, inserting the blank between dies shaped to form the body with a longitudinal groove having upturned sides to provide a continuous, unbroken seat for a conductor throughout the length of the body, the ends of the body being turned downwardly to form flared lips, simultaneously bending the arms upwardly and substantially parallel to each other to form suspension elements, inserting an elongated sheet metal bracket blank member having an elongated central opening and its ends recessed to provide inwardly extending opposed lugs, between dies shaped to form the intermediate portion of the elongated blank on opposite sides of the central opening into a pair of spaced raised laterally offset spreadable portions, removing the bracket blank member from the dies and inserting it between dies shaped to spread the spaced lateral offset portions away from each other and simultaneously to bend the ends of the bracket blank into laterally disposed end flanges having the opposed lugs spaced away from each other, positioning the formed body in the space between the lateral offset portions and the end flanges with the lateral portions adjacent the suspension elements, and inserting the assembled parts between dies shaped to move the lateral offset portions into engagement with the outer sides of the body and for moving the end flanges inwardly so that the lugs are brought into locking engagement with the upper edges of the sides of the body to form a unitary assembly.

3. The method of stamping a bracket member for atachment to a clamp body which includes forming an elongated sheet metal blank having an elongated central opening and its ends recessed to provide inwardly extending opposed lugs, between dies shaped to form the intermediate portion of the elongated blank with raised portions on opposite sides of the central opening that form a pair of spaced spreadable protuberances, removing the blank from the dies and inserting it between dies shaped to spread the protuberances away from each other and simultaneously to bend the ends of the bracket blank into laterally disposed end flanges having the opposed lugs spaced from each other.

GORDON E. DANIELS.

REFERENCES CITED

The following references are of record in the file of this patent:

UNITED STATES PATENTS

| Number | Name | Date |
|---|---|---|
| 1,019,225 | Clark | Mar. 5, 1912 |
| 1,024,830 | Cook | Apr. 30, 1912 |
| 1,040,975 | Clark | Oct. 8, 1912 |
| 1,073,658 | Bolus | Sept. 23, 1913 |
| 1,091,913 | Connable | Mar. 31, 1914 |
| 1,344,105 | Vance | June 22, 1920 |
| 1,786,978 | Aronson | Dec. 30, 1930 |
| 1,957,530 | Dibner | May 8, 1934 |
| 2,067,269 | Johnson et al. | Jan. 12, 1937 |
| 2,123,041 | Hansen | July 7, 1938 |
| 2,223,853 | Melbold | Dec. 3, 1940 |
| 2,364,628 | Garlinghouse | Dec. 12, 1944 |
| 2,398,684 | Woodward | Apr. 16, 1946 |